INVENTOR.
EMERSON W. PUGH
BY Frank Chadurjian
ATTORNEY

United States Patent Office 3,138,789
Patented June 23, 1964

3,138,789

MAGNETOSTRICTIVE DELAY LINE

Emerson W. Pugh, Ossining, N.Y., assignor to International Business Machines Corporation, New York, N.Y., a corporation of New York Filed Nov. 30, 1962, Ser. No. 241,210
7 Claims. (Cl. 340—174)

This invention relates to a magnetostrictive delay line and, more specifically, to a delay line employing an anisotropic thin magnetic film to which succeeding waves of tension and compression are applied to propagate information along the film with means coupled to the film for decoupling the film from the effects of the mechanical stress waves applied thereto whereby the information is permanently stored therein.

Since the onset of magnetic thin film technology, the anticipated reduction of fabrication costs with the added benefits of high speed switching and compact packaging has caused an abundance of research directed primarily to the use of magnetic thin films to replace ferrite cores in a magnetic core memory having the attributes of coincident current selection. As with the case of ferrite core memories, magneto-strictive delay lines have long been recognized as having many desirable attributes for use in data processing equipment and, in some instances, due to cost considerations, have been more profitably employed in small low cost data handling machines.

A magnetostrictive delay line has been proposed in a copending application Serial No. 219,585, filed August 27, 1962, in behalf of J. E. Lovell and assigned to the same assignee of this application. In this copending application, an elongated planar thin magnetic film is provided whose easy axis is transverse with respect to the longitudinal axis of the film. The film may exhibit positive or negative magnetostriction so as to exhibit at least a mechanically induced longitudinal anisotropy directed along the longitudinal axis of the film in response to an applied mechanical tension and compression in a similar direction. Means are provided coupled to the film for applying succeeding waves of tension and compression along the longitudinal axis of the film having a repetition frequency ($f_0$). An input circuit is provided inductively coupling a first portion of the film for applying a longitudinal field thereto when the first portion exhibits the induced longitudinal anisotropy in response to an applied stress wave to conjointly establish the magnetization, in one direction or the other, along the longitudinal axis of the film to define a binary value. This magnetic discontinuity or domain wall, is normally propagated along the length of the film by the mechanical wave propagation. Further means are provided connected to the opposite end of the substrate member for mechanically decoupling of the mechanical stress waves provided to the substrate member.

While mechanical decoupling of the propagating medium is achieved in this copending application, very tight tolerances must be adhered to with attendant increased fabrication costs. These disadvantages are alleviated by constructing a delay line according to this invention wherein decoupling from the propagating medium is achieved electrically. More specifically, a planar uniaxial anisotropic thin magnetic film with easy axis transverse to the longitudinal axis of the film is provided which also exhibits either positive or negative magnestostriction. Mechanical waves of either tension or compression are applied to the film to induce an anisotrophy, due to tension or compression, with easy axis parallel to the longitudinal axis of the film. Input means are provided coupling a first portion of the film and is adapted to apply a field along the easy axis of the film, when that portion of the film does not exhibit an induced longitudinal anisotropy, to establish the magnetization of that portion of the film in either one or an opposite stable state along the easy axis. If operation of the input means provides no change in magnetization orientation in the first portion of the film, then no magnetic discontinuity, i.e., domain wall is established. However, if magnetization reversal is induced, then a domain wall results. The thickness of the thin film is such that if a domain wall is established within the film, it will take the form of a Néel wall rather than a Bloch wall and will thus be propagated along the film by the mechanical stress waves. To decouple the domain wall from the mechanical waves providing propagation of the wall along the thin film, a magnetic control field of predetermined magnitude is applied perpendicular to the plane of the film. This control field causes conversion of the Néel wall to a Bloch wall. Once the domain wall takes the form of a Bloch wall, the anisotropy induced by the mechanical tension and compression waves have no effect, causing information, in the form of the domain wall, to be stored at a fixed position within the film.

Accordingly, it is a prime object of this invention to provide an improved magnetostrictive delay line in which information may be permanently stored.

A further object of this invention is to provide an improved magnetostrictive delay line employing an elongated anisotropic magnetic thin film capable of supporting both Néel and Bloch walls, in which information is established and propagated in the form of a Néel wall by use of a mechanically induced transverse anistotropy in the film, and where propagation of the information is inhibited by conversion of the Néel wall to a Bloch wall.

Still another object of this invention is to provide a useful application for conversion of Néel wall to a Bloch wall in a magnetic element.

The foregoing and other objects, features and advantages of the invention will be apparent from the following more particular description of a preferred embodiment of the invention, as illustrated in the accompanying drawings.

Figure 2:
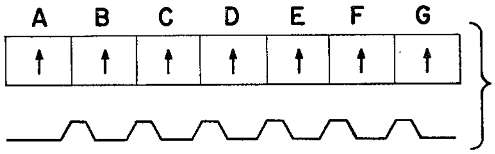
FIG. 2 is a hypothetical illustration of the effect of a mechanical stress wave applied to the delay line of FIG. 1.

FIGS. 3*a*–3*f* illustrate a conception of information propagation in the delay line of FIG. 2.

Figure 4:
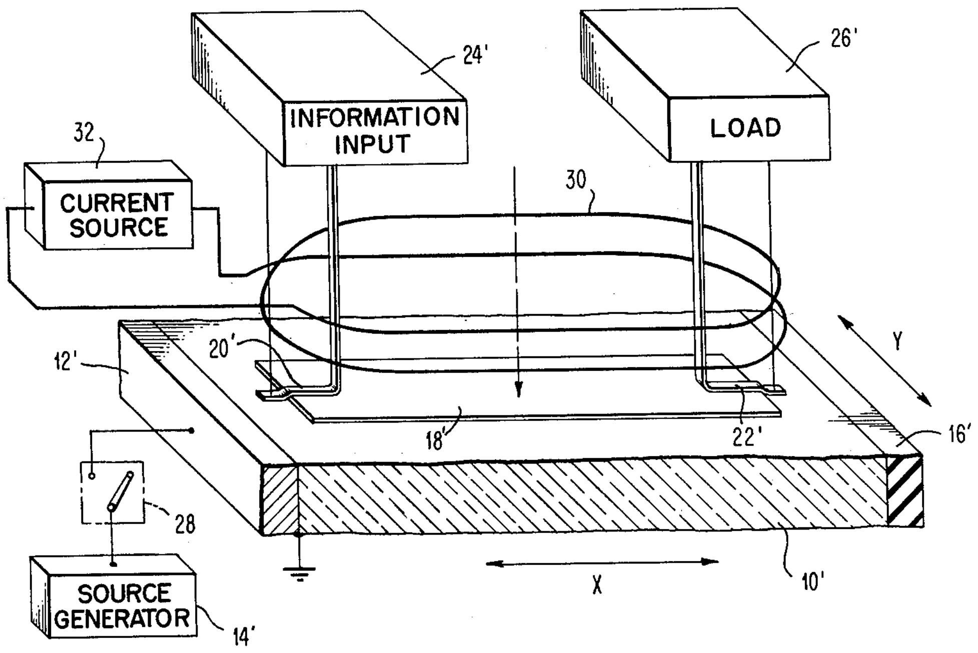

FIG. 4 illustrates an improved delay line according to an embodiment of this invention.

Figure 5:
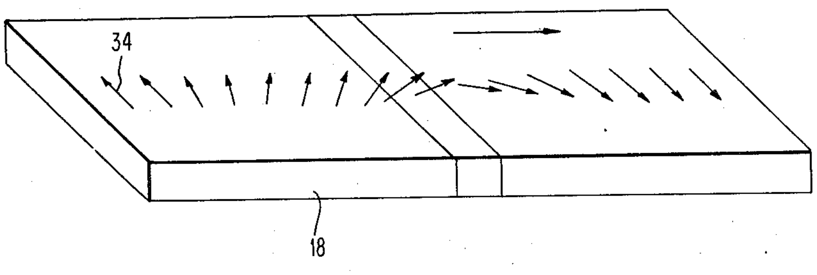

FIG. 5 illustrates the orientation of the magnetization vectors in accordance with the operation of the delay line of FIG. 4.

Figure 1:
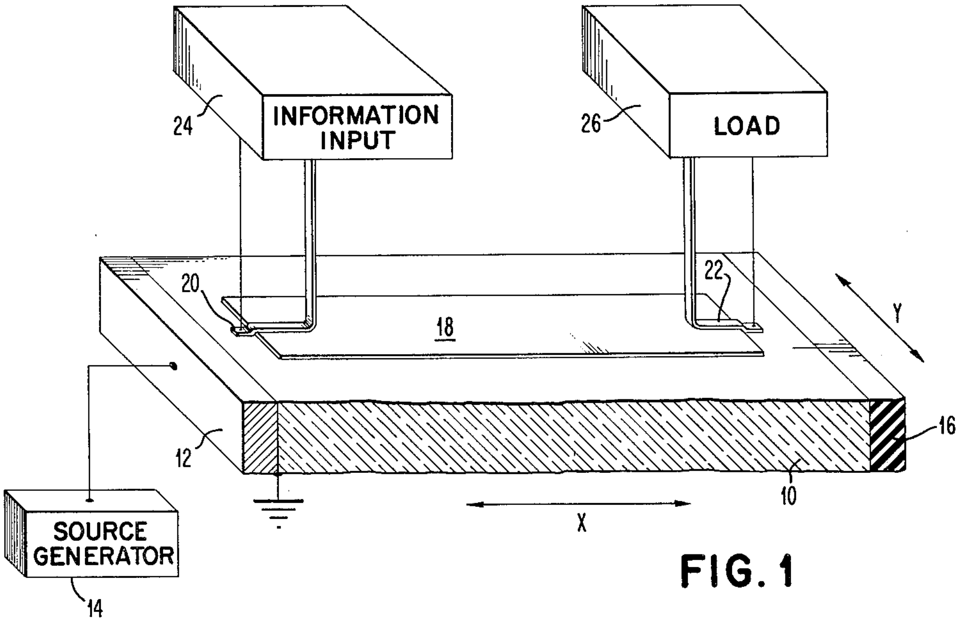
FIG. 1 is a schematic illustration of a magnetostrictive delay line.

Referring to FIG. 1, there is provided a suitable non-magnetic substrate member 10, made of single crystal or fused quartz material which has a characteristic of compressing and expanding in response to acoustical signals applied thereto with a minimum amount of attenuation. That is, with respect to the longitudinal axis of the substrate member 10, here defined by an arrowed X coordinate axis, the material of member 10 expands and contracts with respect to the longitudinal X axis in response to acoustical waves applied thereto by means of an acoustical transducer 12. The acoustical transducer 12 is connected at one end of the member 10 and connected to a source generator 14. At the opposite end of substrate member 10 an absorbing medium 16 is provided for absorbing any strain or stress of the substrate member 10. It should be understood that instead of the absorbing medium 16, the substrate 10 could be tapered at this end and the effect would be the same. Deposited on one surface of the member 10 is an uniaxial anisotropic magnetic thin film 18 exhibiting an easy axis of magnetization directed along a transverse axis of the member 10 indicated by an arrowed axis Y. The magnetic film 18 may be deposited on the member 10 by any well-known method such as vacuum evaporation cathode disintegration, electroplating, etc., in the presence of a magnetic field to provide the easy axis of remanent flux orientation which is directed along the axis Y and is in alignment with the direction of the magnetic field applied during the deposition process. The magnetic material deposited is an alloy of nickel-iron comprising approximately 85% Ni and 15% Fe, or 75% Ni and 25% Fe by weight. The particular composition of ferromagnetic material is chosen so that the film 18 may exhibit negative magnetostriction (85% Ni–15% Fe), or positive magnetostriction (75% Ni–25% Fe).

Positive magnetostriction may be defined as that property of a magnetic material, such as film 18 when subjected to a mechanical tension and compression along its longitudinal axis, to exhibit a mechanically induced magnetic anisotropy with easy axis parallel to the direction of applied tension and to exhibit an induced magnetic anisotropy with easy axis perpendicular to the longitudinal direction of compression. Negative magnetostriction may be defined as that property of a magnetic material, when subjected to a mechanical tension and compression along its longitudinal axis, here the X axis, to exhibit an induced magnetic anisotropy with easy axis parallel to the longitudinal axis due to compression, and to exhibit an induced magnetic anisotropy with easy axis perpendicular to the direction of longitudinal tension. For more details with respect to the differences in magnetostriction, reference may be made to a book entitled, "Ferromagnetism" by Richard Bozorth, published by the D. Van Nostrand Company, Inc., copyrighted and first published in 1951, and reprinted in 1953 and 1955. Thus, assuming the film 18 exhibits positive magnetostriction, when the member 10 is compressed, the mechanically induced magnetic anisotropy of film 18 will have an easy axis along the Y axis and when the substrate member 10 is under tension, i.e., expansion, the mechanically induced magnetic anisotropy of the film 18 will be in a direction parallel to the X axis. The medium 10, and hence, the film 18 which is coupled thereto will undergo tension, or compression in response to acoustical waves provided by source generator 14 through transducer 12.

An input conductor 20 is provided inductively coupling a portion of film 18 along its length and is positioned transverse with respect to the easy axis thereof, and an output conductor 22 is provided coupling a different portion of the film 18, removed from the input conductor, along the length of film 18 and positioned transverse with respect to the easy axis. The input conductor 20 is connected to an information input means 24 while the output conductor 22 is connected to a load 26.

The source 14 in combination with transducer 12 is adapted to apply succeeding impulses to the substrate 10 each of which causes the substrate 10 and hence the film 18 coupled thereto, to expand or contract. Depending upon whether the film 18 is caused to expand and/or contract in response to the acoustical impulses applied thereto, the film 18 is fabricated to exhibit either positive or negative magnetostriction to provide in all instances an induced longitudinal anisotropy in that portion of the film 18 subjected to mechanical stress. Further, the magnitude of the mechanical stress provided to the film 18 is insufficient to overcome the switching threshold of the film.

Referring to FIG. 2, the film 18 is hypothetically illustrated, for purposes of explanation, as defining seven zones labelled A–G. Immediately below the film 18 there is illustrated, for a given instant, an acoustical signal in the member 10 which comprises a series of stress impulses successively applied to the film 18 at predetermined time intervals. The magnetization of the film 18 is initially assumed to be directed upward along the easy axis of the film 18 as is shown in all the zones A–G.

At this juncture, it will be helpful to consider in some detail the general orientation of magnetic vectors within a domain wall. The transition of magnetic orientation as shown by zone A to an oppositely oriented zone may take place by rotation of the magnetization in the plane of the film as shown in zone A, for example, clockwise to an opposite orientation state than that shown in zone B. Alternately, the rotation could be counterclockwise. This transition of magnetization may take place by rotation within the plane of the film 18. If two adjacent zones have their magnetization vectors oppositely oriented, then the transition of magnetization vectors could take place by a gradual transition out of the plane of the film, spirally, from one stable state to an opposite stable state. When the magnetization vectors of a domain wall rotate within the plane of the film, the domain wall is classified as Néel wall. When the magnetization vectors of a domain wall rotate out of the plane of the film from one state to an opposite state, then the domain wall is classified as a Bloch wall. The differences between a Néel and a Bloch wall are well understood by those versed in the art and is also described by Bozorth, op. cit.

Figure 3A:
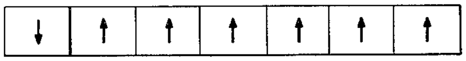

Assume that when the boundaries between the zones are subjected to a mechanical stress, FIG. 2, that the input conductor 20 is energized by information input means 24 to apply a magnetic field to the zone A directed downward along the easy axis thereof. This input field is controlled to be of sufficient magnitude to switch the magnetization of zone A from an upward remanent stable state to an opposite or downward remanent stable state. The magnetization of film 18 is then as illustrated in FIG. 3*a*. Referring to FIG. 3*a*, it may be seen that the direction of magnetization of zone A is downward while that of all other zones is upward. Since the magnetization of zone A is directed downward along the easy axis of film 18, the transition region between zones A and B, illustrated by a darkened area takes place by a gradual rotation of the magnetic vectors in the plane of the film from the downward direction along the easy axis, to orientation in the upward direction, along the easy axis of film 18, in zone B.

As the stress signals to the film 18 propagate from left to right along the longitudinal axis of the film, the magnetic domain wall established by energization of the input conductor 20 is also propagated, by the stress waves, in the film 18. This propagation may be seen by reference to FIGS. 3*a*–3*f*. The magnetization of zone A in FIG. 3*a* is shown to be transferred to succeeding zones in each succeeding illustration of FIGS. 3*b*–3*f*, respectively.

Information is thus represented in the film 18 by the presence or absence of a domain wall. In accordance with well-known techniques for storing and representing binary information, the presence of a domain wall may represent a binary "1," while the absence of a domain wall represents a binary "0." If it is desired to again insert a binary "1," then the input conductor 20 is energized to apply a field to zone A of film 18 directed upward along the easy axis which is of sufficient magnitude to switch its magnetization shown in FIG. 3*c* causing formation of a domain wall between zones A and B, as shown in FIG. 3*d*. Application of a succeeding stress wave causes motion of the domain thus created as is shown in FIG. 3*e*.

Figure 3B:
Figure 3C:
Figure 3D:
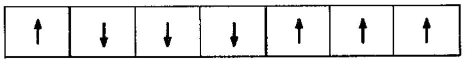
Figure 3E:

The output conductor 22 senses the passing of a domain wall since a voltage is induced therein which is utilized by the load 26 to denote the presence of a binary "1." The output circuitry may include timing circuitry related to the timing of the stress waves so that whenever a voltage is not induced in the output conductor 22, this is taken to mean a binary "0" stored while an induced voltage provides a binary "1." For instance, in accordance with FIGS. 3*a*–3*c*, the information stored, as is shown in say FIG. 3*d*, is 0001001.

The circuit of FIG. 1 functions as a delay line in that information is put into the circuit and at some defined interval of time is available at its output. In order to store the information, the information could be circulated providing a closed loop arrangement, such as coupling the output conductor 22 back to the input conductor 20. Although a circulating loop may be provided as set forth, the inherent storage capabilities of the magnetic film 18 is not utilized, requiring the source generator 14 to be operated constantly without breakdown.

In FIG. 4, an improved structure for the circuit of FIG. 1 is shown. Additional means are provided capable of decoupling the film 18 from the acoustical waves provided by source 14 to thereby allow the information to be permanently stored in the film 18. For the purposes of clarity, all parts of FIG. 4 similar to FIG. 1 are similarly labelled and distinguished by use of a prime notation. In FIG. 4, the acoustical transducer 12′ is connected to the source generator 14′ through a switching means 28. A control coil 30 is associated with the structure connected to a selectively operable current source 32. The source 32 is operable to energize the control coil 30 and apply a magnetic field directed transverse with respect to the plane of the film 18.

Referring to FIG. 4, assume the switch 28 is operated to connect the source 14′ to the transducer 12′ and that the source 24′ has been operative to energize the input conductor 20′ as previously set forth above with respect to FIGS. 3*a*–3*f*. As stated previously, the establishment of a domain wall may represent a binary bit of information and is propagated along the longitudinal axis of film 18 by the mechanical wave providing the induced longitudinal anisotropy. It is here assumed that the domain wall established is in the form of a Néel wall wherein the magnetization vectors rotate from one direction of orientation to another within the plane of the film as opposed to Bloch wall wherein the magnetization vectors rotate from one direction of orientation to another by the magnetization vectors spirally rotating out of the plane of the film 18 as is shown in FIG. 5.

Magnetization vectors 34 illustrate the transition of the magnetization within a portion of film 18 from one orientation state to another when a Bloch wall is established. As may be seen, with the establishment of a domain wall, the magnetization vectors rotate from one position of orientation within the plane of the film, perpendicular to the plane of the film and then in an opposite orientation direction in the plane of the film in spiral fashion. If the domain walls established within the film 18 are kept in the form of a Néel wall, then the stress induced longitudinal easy axis which acts within the plane of the film will effect the magnetization vector orientation of the Néel wall to cause propagation. If however, a Bloch wall is established, since the magnetization vectors defining a Bloch wall are directed without the plane of the film as illustrated in FIG. 5, then coincidence of both stress induced anisotropy and domain vector orientation within the plane of the film is absent and the wall is not caused to propagate.

In order to assure that the material of film 18 will be more likely to establish a Néel wall rather than a Bloch wall, the film 18 is made to have a predetermined thickness. It has been found that with the thickness of the material of film 18 being approximately 500 Angstroms, both Néel walls and Bloch walls are possible but due to this thickness, only Néel walls are initiated. With respect to the probability of Néel walls or Bloch walls being created in a magnetic material of specified thickness, reference is made to an article entitled, "Remarks on the Theory of Magnetic Properties of Thin Films and Fine Grains" by Louis Néel, appearing in the Journal of Physics Radium, vol. 17, No. 3 (1956). A further explanation of the movement of a Néel wall and its form with respect to a Bloch wall is provided by reference to an article entitled "Proposal for Magnetic Domain Wall Storage and Logic" by D. O. Smith, IRE Transactions on Electronic Computers, vol. EC–10, No. 4, pages 708–711, December 1961.

It is therefore the purpose of control coil 30 and the source 32 to provide a control magnetic field directed perpendicular the plane of the film 18′ to rotate the magnetization vectors of the film 18′ out of the plane of the film in each portion of the film 18′ where a Néel wall exists and thereby establish a Bloch wall. In practice, although application of the control field to film 18′ effectively decouples the film 18′ from the mechanical stress impulses, it is desirable to permanently store the information in the film 18′. Remanent storage is provided by operation to the switching means 28 to disconnect the source 14′ from transducer 12′ and after a predetermined time interval, a time sufficient to allow passage of all acoustical and, hence, mechanical waves, the control field collapses. Upon collapse of the control field, the Bloch walls previously established are reestablished in the film 18′ as Néel walls due to the characteristic of the film 18 to sustain Néel walls rather than Bloch walls.

Where the magnetization is directed downward along the easy axis of the film 18, a Bloch wall would not be established in the material such as between the zone D and the zone E in FIG. 3*e* when the control field, provided by energized coil 30, is applied to the plane of film 18. Referring to FIG. 5, the magnetic vector orientation for a Bloch wall is illustrated. As stated previously, the transition of magnetization is from vector orientation in one direction in the plane of the film 18, spirally, to orientation in an opposite direction in the plane of the film. For such a transition to exist, the magnetization of magnetic material on either side of the transition region, i.e., domain wall, must be oppositely oriented in the plane of the film. Further, since the information input means 24 must provide impulses of opposite polarity to the input conductor 20 when storing of succeeding 1's, the means 24 may have, incorporating therein a binary trigger circuit or flip-flop circuit adapted to provide an output pulse of one polarity upon receipt of a first input pulse and an output pulse of another polarity upon receipt of a second input pulse. Such circuits are well known and not considered necessary in understanding and constructing the circuits according to this invention.

It should be understood that while an output circuit is shown employing inductive coupling of the film, other techniques may be employed such as the use of the Kerr magneto-optic effect.

While the invention has been particularly shown and described with reference to a preferred embodiment thereof, it will be understood by those skilled in the art that various changes in form and details may be made therein without departing from the spirit and scope of the invention.

What is claimed is:

1. An information delay circuit;

an elongated planar anisotropic thin magnetic film having an overall magnetization in one sense and capable of supporting domain walls in the form of both Néel and Bloch walls;

input means inductively coupled to a first portion of said film for creating a Néel wall therein to definie a binary value;

propagating means coupled to said film for propagating said Néel wall along its length;

output means coupled to a different portion of said film along its length for sensing the passage of said Néel wall; and, control means for decoupling said domain wall from said propagating means comprising, means for applying a field perpendicular to the plane of said film to convert said Néel wall to a Bloch wall.

2. The circuit of claim 1, wherein said magnetic film is approximately 500 Angstroms thick.

3. The circuit of claim 2, wherein said output means inductively couples said film.

4. The circuit of claim 2, wherein said thin film is uniaxial anisotropic.

5. An information control circuit comprising;

an elongated planar anisotropic thin magnetic film having an easy axis of remanent flux orientation which is transverse with respect to the longitudinal axis thereof, said film capable of supporting domain walls in the form of both Néel and Bloch walls;

signal input means inductively coupled to a first portion of said film for creating a Néel wall therein to define a binary value;

propagating means coupled to said film for propagating said Néel wall along the length of said film, output means coupled to a different portion of said film along its length for sensing the passage of said Néel wall, and means for decoupling said domain wall from said propagating means comprising means for applying a field substantially transverse to the plane of said film to convert said Néel wall to a Bloch wall.

6. A control circuit comprising:

an elongated planar anisotropic thin magnetic film having an easy axis of magnetization transverse to its longitudinal axis and magnetized in one stable state along its easy axis, said film being capable of supporting domain walls in the form of both Néel and Bloch walls and exhibiting a mechanically induced anisotropy directed along its longitudinal axis in response to mechanical stress applied along its longitudinal axis;

input means inductively coupled to a first portion of said film for magnetizing said portion coupled in an opposite sense with respect to a succeeding portion thereof to create a Néel wall;

propagating means coupled to said film for applying stress waves along its longitudinal axis of said film and thereby propagate said Néel wall along the length of said film;

output means inductively coupled to a different portion of said film for sensing the passage of said Néel wall and providing an indication thereof; and control means for decoupling said domain wall from said propagating means comprising means for applying a field perpendicular to the plane of said film to convert said Néel wall to a Bloch wall.

7. An information delay circuit comprising;

an elongated planar anisotropic thin magnetic film having an easy axis of remanent flux orientation which is transverse with respect to its longitudinal axis, said film being capable of supporting domain walls in the form of both Néel and Bloch walls and exhibiting an induced longitudinal anisotropy in response to a mechanical stress applied along the longitudinal axis of said film;

signal input means inductively coupled to a first portion of said film for applying a field along the easy axis thereof to switch said first portion to a stable magnetic state opposite to the stable magnetic state of a succeeding portion of said film and thereby create a Néel wall;

propagating means coupled to said film for applying mechanical stress waves along the length of said film to propagate said domain wall along the length of said film;

output means inductively coupling a portion of said film along its length for sensing the passage of said domain wall and providing an output manifestation thereof; and control means for decoupling said domain wall from said propagating means comprising means for applying a field perpendicular to the plane of said film to convert the form of said domain wall from a Néel wall to a Bloch wall.

No references cited.